(12) United States Patent
Uddin et al.

(10) Patent No.: US 10,834,240 B2
(45) Date of Patent: Nov. 10, 2020

(54) SERVICE AUTOMATION FOR IOT DEVICES USING P4

(71) Applicant: Nokia Technologies Oy, Espoo (FI)

(72) Inventors: Mostafa Uddin, Holmdel, NJ (US);
Hyunseok Chang, Holmdel, NJ (US);
T.V. Lakshman, Morganville, NJ (US);
Sarit Mukherjee, Morganville, NJ (US)

(73) Assignee: Nokia Technologies Oy, Espoo (FI)

( * ) Notice: Subject to any disclaimer, the term of this patent is extended or adjusted under 35 U.S.C. 154(b) by 119 days.

(21) Appl. No.: 16/059,767

(22) Filed: Aug. 9, 2018

(65) Prior Publication Data
US 2020/0053190 A1 Feb. 13, 2020

(51) Int. Cl.
*H04L 29/06* (2006.01)
*H04L 29/08* (2006.01)
*H04L 12/741* (2013.01)
*H04L 12/46* (2006.01)

(52) U.S. Cl.
CPC .......... *H04L 69/22* (2013.01); *H04L 12/4633* (2013.01); *H04L 29/067* (2013.01); *H04L 45/74* (2013.01); *H04L 63/0428* (2013.01); *H04L 63/123* (2013.01); *H04L 67/16* (2013.01)

(58) Field of Classification Search
CPC ....... H04L 69/22; H04L 63/123; H04L 45/74; H04L 12/4633; H04L 29/067; H04L 63/0428; H04L 67/16; H04L 69/18; H04L 41/00
See application file for complete search history.

(56) References Cited

U.S. PATENT DOCUMENTS

| | | | |
|---|---|---|---|
| 9,618,222 B1 * | 4/2017 | Hussain | F24F 11/30 |
| 2007/0195939 A1 * | 8/2007 | Sink | H04L 41/00 379/37 |
| 2011/0004913 A1 * | 1/2011 | Nagarajan | H04L 63/102 726/1 |
| 2013/0094447 A1 * | 4/2013 | Gidlund | H04L 69/22 370/328 |
| 2017/0064047 A1 * | 3/2017 | Bosshart | H04L 69/22 |
| 2017/0214660 A1 * | 7/2017 | Shah | H04L 63/0272 |
| 2018/0062995 A1 * | 3/2018 | Naar | G06F 16/9017 |
| 2019/0116028 A1 * | 4/2019 | Liu | H04L 9/3242 |

OTHER PUBLICATIONS

"A WS IoT" https://aws.amazon.com/iot/.
"Amazon Echo Plus" https://www.amazon.com/echoplus.
(Continued)

*Primary Examiner* — Will W Lin
(74) *Attorney, Agent, or Firm* — Duft & Bornsen, PC

(57) ABSTRACT

System, method, and software for managing packet forwarding by end devices that use Zigbee protocol. In one embodiment, a P4 switch is implemented at an edge of an IP network as an intermediary between the end devices that use Zigbee protocol so that packets forwarded by each of the end devices flow through the switch. The switch includes a transceiver configured to receive a packet forwarded by a first endpoint in an end device and destined for a second endpoint. The switch includes a P4 parser configured to parse the packet to identify fields of the packet, and a P4 analyzer configured to process a plurality of match-action tables and the fields of the packet to provide data plane handling of the packet.

20 Claims, 6 Drawing Sheets

(56) References Cited

OTHER PUBLICATIONS

"Cisco Jasper" https://www.jasper.com.
"Phillips Hue Bridge" https://www.usa.philips.com/c-p/046677458485/hue-bridge.
"Samsung Smart Things" https://www.smartthings.com.
"The P4 Language Specification 1.0.3" The P4 Language Consortium, 2016.
"Zigbee Alliance" http://www.zigbee.org.
A. Botta, W. De Donato, V. Persico and A. Pescap'e; "On the Integration of Cloud Computing and Internet of Things" in Proc. IEEE FiCloud, 2014.
A. Levy, J. Hong, L. Riliskis, P. Levis, and K. Winstein, "Beetle: Flexible Communication for Bluetooth Low Energy" in Proc. ACM MobiSys, 2016.
B. Zhang et al., "The Cloud is Not Enough: Saving IoT from the Cloud" in Proc. ACM HotCloud, 2015.
J. Zhou, Z. Cao, X. Dong, and A.V. Vasilakos, "Security and Privacy for Cloud-Based IoT: Challenges" IEEE Communications Magazine, vol. 55, No. 1, 2017.
M. Andersson, "Use case possibilities with Bluetooth low energy in IoT application" White Paper, 2014.
M. Hassanalieragh et al., "Health Monitoring and Management Using Internet-of-Things (IoT) Sensing with Cloud-based Processing: Opportunities and Challenges" In Proc IEEE SCC, 2015.
N. Mor et al., "Toward a Global Data Infrastructure" IEEE Internet Computing, vol. 20, No. 3 , 2016.
R. Lea and M. Blackstock, "City HUb: A Cloud-based IoT Platform for Smart Cities" in Proc. IEEE CloudCom, 2014.
T. Zachariah, N. Klugman, B. Campbell, J. Adkins, N. Jackson, and P. Dutta, "The Internet of Things Has a Gateway Problem" in Proc. ACM HotMobile, 2015.
W. McGrath, M. Etemadi, S. Roy and B. Hartmann; "Fabryq: Using Phones as Gateways to Prototype Internet of Things Applications Using Web Scripting" in Proc. ACM SIGCHI, 2015.
W. Shang et al., "Named Data Networking of Things" in Proc. ACM/IEEE IoTDI, 2016.
W. Shang, Y. Yu, R. Droms, and L. Zhang, "Challenges in IoT Networking via TCP/IP Architecture" UCLA, Tech. Rep., 2016.

* cited by examiner

| |
|---|
| Rule1: table=1, NWK_source=IAS_sensor, NWK_destination=Coordinator, NWK_frame_control=data_type, actions=set_field:0x01->metadata.table1_tag, goto_table:2 |
| Rule2: table=2, metadata.table1_tag=0x01, APS_framecontrol=data, APS_dst_endpoint=a, APS_cluster=IAS, APS_profile=HA, APS_src_endpoint = b, actions=set_field:coordinator->NWK_source, set_field:light->NWK_dst, set_field:a->APS_src_endpoint, set_field:c->APS_dst_endpoint, set_field:OnOff->APS_cluster, set_field:0x01->metadata.table2_tag, goto_table=3 |
| Rule3: table=3, metadata.table2_tag=0x01, ZCL_IAS_frame_control=cluster_specific_client, ZCL_IAS_command=status_notification, ZCL_IAS_zonestatus=Alarm, actions=remove_header:ZCL_IAS, add_header:ZCL_On_Off, set_field:cluster_specific_server->ZCL_On_Off_frame_control, set_field:ON->ZCL_On_Off_command, set_field:0x01>metadata.table3_tag, goto_table:4 |
| Rule4: table=3, metadata.table2_tag=0x01, ZCL_IAS_frame_control=cluster_specific_client, ZCL_IAS_command=status_notification, ZCL_IAS_zonestatus=NoAlarm, actions=remove_header:ZCL_IAS, add_header:ZCL_On_Off, set_field:cluster_specific_server->ZCL_On_Off_frame_control, set_field:OFF->ZCL_On_Off_command, set_field:0x01->metadata.table3_tag, goto_table:4 |
| Rule5: table4, metadata.table1_tag=0x01, metadata.table2_tag=0x01, metadata.table3_tag=0x01, actions=update_sequence_numbers(), output:1 |

SERVICE AUTOMATION FOR IOT DEVICES USING P4

TECHNICAL FIELD

This disclosure relates to the field of communication systems and, in particular, to wireless communications.

BACKGROUND

Internet of Things (IoT) is a system of devices that transfer data over a network without requiring human-to-human or human-to-computer interaction. IoT applications are used to provide a variety of services, such as industrial automation, home automation, health-care, agriculture, etc. These applications require the networking and coordination of large numbers of IoT devices for services that typically need sensing of an environment, analyzing information in real-time, and initiating appropriate actions. IoT devices use an underlying communication protocol, such as Zigbee, to create a Wireless Personal Area Network (WPAN). One approach to interconnecting IoT devices is a peer-to-peer approach where IoT devices communicate natively (i.e., Zigbee) in a peer-to-peer manner. Another approach is a cloud-centric approach where an intermediary gateway connects IoT devices to cloud-hosted middleware. The gateway connects to the IoT devices using Zigbee, and connects to the cloud over the Internet. One drawback to the peer-to-peer approach is that policy enforcement and access control to device profiles is hard to implement. Some drawbacks to the cloud-centric approach are delay in reactivity because all messages from the IoT devices are sent back to the cloud, and the risk that the cloud-hosted middleware becomes unreachable due to a service outage. Due to the growth of IoT, it may be desirable to identify improved approaches for implementing IoT-type networks.

SUMMARY

Embodiments described herein provide a system, method, and software that improve interaction between IoT devices for providing services. One or more switches are implemented at the edge of a packet-switched network, such as the Internet. Each switch acts as an intermediary between end devices (i.e., IoT devices) so that packets forwarded by the end devices flow through the switch. When the switch receives a packet from an end device, the switch uses P4 programming language to process the packet before forwarding the packet to an endpoint. P4 match-action tables are programmed in the switch to control processing of the packet according to desired policies/rules. A system as described herein is advantageous in that the switches are implemented at the edge of the network to maintain low-latency transmissions, and is massively scalable by installing many switches. The architecture also allows for strong policy enforcement and enables interworking amongst devices that use different cluster profiles via the P4 match-action tables that are pushed to the switches. Thus, the system described herein does not suffer from the limitations described above.

One embodiment comprises a system that includes a switch implemented at an edge of an Internet-Protocol (IP) network as an intermediary between end devices that use Zigbee protocol so that packets forwarded by each of the end devices flow through the switch. The switch includes a transceiver configured to receive a packet forwarded by a first endpoint in a first one of the end devices and destined for a second endpoint. The switch also includes a P4 parser configured to parse the packet to identify fields of the packet, and a P4 analyzer configured to process a plurality of match-action tables and the fields of the packet to provide data plane handling of the packet.

In another embodiment, the P4 analyzer is configured to determine an encryption status of the packet after parsing by the P4 parser. Responsive to a determination that the packet is encrypted, the P4 analyzer is configured to route the packet through a first control flow of first match-action tables of the plurality, and to decrypt the packet based on the first match-action tables. The switch further includes an output configured to re-circulate the packet as decrypted back to the P4 parser.

In another embodiment, the P4 analyzer is configured to verify a Message Integrity Code (MIC) in an Application Support Sublayer (APS) frame in the packet, and to remove security information from a network header of the packet based on the first match-action tables.

In another embodiment, the P4 analyzer is configured to determine an encryption status of the packet after parsing by the P4 parser upon the packet being re-circulated. Responsive to a determination that the packet is decrypted, the P4 analyzer is configured to route the packet through a second control flow of second match-action tables of the plurality. The P4 analyzer is configured to process the second match-action tables to determine whether at least one field of a network header in the packet matches a first entry in the second match-action tables, and perform a first action in response to a match of the first entry. The P4 analyzer is configured to process the second match-action tables to determine whether at least one field of an APS header in the packet matches a second entry in the second match-action tables, and perform a second action in response to a match of the second entry. The P4 analyzer is configured to process the second match-action tables to determine whether at least one field of a Zigbee Cluster Library (ZCL) frame in the packet matches a third entry in the second match-action tables, and perform a third action in response to a match of the third entry. The P4 analyzer is configured to process the second match-action tables to encrypt the packet. The output is configured to forward the packet after encryption to the second endpoint.

In another embodiment, the first endpoint and the second endpoint have incompatible cluster profiles. The P4 analyzer is configured to process the second match-action tables to modify at least one of the fields in the packet so that the cluster profiles are interoperable.

In another embodiment, the switch further comprises a network interface configured to communicate with peer switches over the IP network via an IP tunnel. Each of the peer switches are deployed at the edge of the IP network.

In another embodiment, the network interface is configured to communicate with a central controller, and to receive updates to the plurality of match-action tables from the central controller.

In another embodiment, the network interface is configured to receive a network key for encrypting/decrypting the packet from the central controller.

In another embodiment, the switch further comprises a manager configured to identify a Personal Area Network (PAN) identifier assigned to a PAN for the switch, and to insert the PAN identifier in metadata for the packet.

In another embodiment, the system further comprises the central controller. The central controller is configured to receive information for the first one of the end devices from the switch, to determine whether the first one of the end devices is authorized to be connected to the switch, and to transmit a response to the switch confirming authorization of the first one of the end devices responsive to a determination that the first one of the end devices is authorized.

Another embodiment comprises a method of managing packet forwarding by end devices that use Zigbee protocol. The method includes receiving, at a switch, a packet forwarded by a first endpoint in a first one of the end devices and destined for a second endpoint using Zigbee protocol. The switch is implemented at an edge of an IP network as an intermediary between the end devices that use Zigbee protocol so that packets forwarded by each of the end devices flow through the switch. The method further includes parsing, via a P4 parser in the switch, the packet to identify fields of the packet. The method further includes processing, via a P4 analyzer in the switch, a plurality of match-action tables and the fields of the packet to provide data plane handling of the packet.

Another embodiment comprises a switch implemented at an edge of an IP network as an intermediary between end devices that use Zigbee protocol so that packets forwarded by each of the end devices flow through the switch. The switch includes a means for receiving a packet forwarded by a first endpoint in a first one of the end devices and destined for a second endpoint. The switch also includes a means for parsing the packet using P4 to identify fields of the packet, and a means for processing a plurality of P4 match-action tables and the fields of the packet to provide data plane handling of the packet.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

FIG. 8 illustrates match-action tables in an illustrative embodiment.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
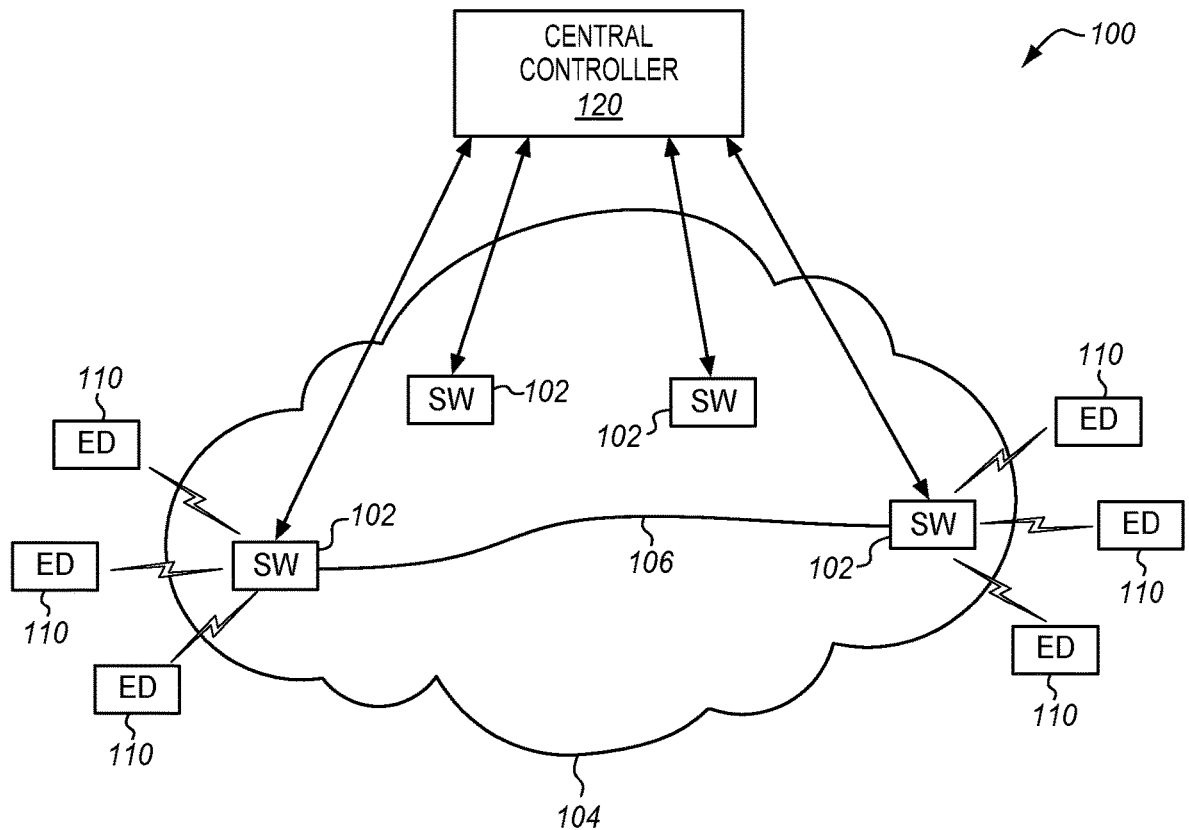
FIG. 1 illustrates an architecture for IoT in an illustrative embodiment.

FIG. 1 illustrates an architecture 100 for IoT in an illustrative embodiment. Architecture 100 is a system or network infrastructure that includes a plurality of switches (SW) 102 interconnected via an Internet Protocol (IP) network 104, or another type of packet-switched network. In this embodiment, multiple switches 102 are deployed in architecture 100 and may be spread over a wide area to form a wide-range IoT network infrastructure. In other embodiments, more or less switches 102 may be deployed as desired. Each switch 102 may be a programmable Software-Defined Network (SDN) element that is deployed at the edge of IP network 104. An edge device is defined as a device which provides an entry or ingress point into IP network 104. Switches 102 may exchange traffic with one another via a backhaul IP tunnel 106 over IP network 104.

A switch 102 resides between multiple end devices (ED) 110. An end device 110 is a node or device configured to communicate with a switch 102 via wireless signals to transmit or receive data. End devices 110 may be used for applications such as lighting control, a smoke detector, and home security monitoring, etc. A switch 102 acts as an intermediary device between any two end devices 110 such that peer-to-peer traffic between two end devices 110 travels through a switch 102.

Architecture 100 also includes a central controller 120. Central controller 120 is configured to provide overall network control, user-defined policy enforcement, policy table management on switches 102, and other related functions.

Figure 2:
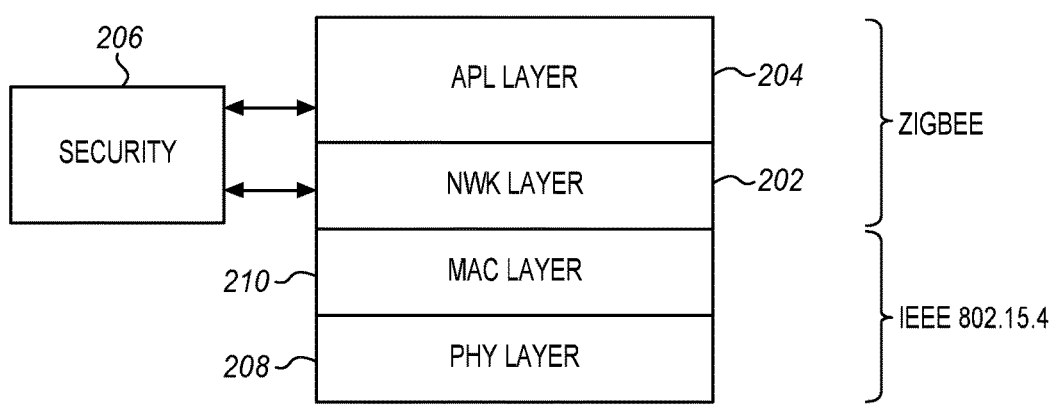
FIG. 2 illustrates Zigbee protocol layers.

End devices 110 communicate with a switch 102 according to a communication protocol. One example of the communication protocol is Zigbee. Zigbee is an IoT protocol standard that supports mesh-like networks with routing capability. FIG. 2 illustrates Zigbee protocol layers. Zigbee protocol is defined in three layers: a network (NWK) layer 202, an application (APL) layer 204, and a security layer 206. These layers are on top of the existing IEEE 802.15.4 physical (PHY) layer 208 and Medium Access Control (MAC) layer 210. When multiple Zigbee devices need to be interconnected at the network layer, a designated routing-capable device with the role of a coordinator (typically a Zigbee hub/gateway) starts a Zigbee network, and other devices join the network as either end devices or routers. While the end devices transmit or receive Zigbee packets without routing capability, the router is configured to route packets among end devices. To perform routing among end devices, the coordinator and routers exchange one-hop neighbor and available route information among themselves.

An active Zigbee network is identified with a unique 16-bit PAN identifier chosen by the coordinator at the time the network is created. For each Zigbee device (end device or router) connected to a network, a 16-bit network address is allocated by the coordinator for routing purposes. In Zigbee, routing is confined to a particular network formed by the coordinator. Thus, the per-device network addresses are unique within a given PAN, and Zigbee packets carry network addresses (but not the PAN ID) in the network header.

On top of network layer 202 is application layer 204, where a list of application objects is defined by the Zigbee standard for user applications. An application object is an abstraction for application-level functionality. A single physical Zigbee device can have up to 240 application objects for different functions, each of which is randomly assigned an endpoint address (1 to 240).

In order for two Zigbee devices to communicate at application layer 204, a binding process is performed by the coordinator, which creates a logical link between two endpoints of these devices. The information regarding these logical links across different device endpoints is maintained by the Application Support Sublayer (APS). Based on device binding information, the APS layer forwards Zigbee packets from network layer 202 to target endpoints at application layer 204. For this, the APS layer populates and processes the APS header in Zigbee packets, which includes source and destination endpoint address fields.

For two devices to get bound at the APS layer, the devices must be functionally related and thus interoperable. For device interoperability, the Zigbee standard developed a set of application profiles to be associated with application objects. Each application profile is named after its corresponding application usage (e.g., home automation profile). An application profile contains one or more clusters which represent finer granular functionality. A cluster (identified by a 16-bit cluster ID) is defined as a set of device-specific attributes, and a set of commands that operate on the attributes. There are generic commands such as read, write, and report an attribute, while other commands are cluster specific. There are also input clusters (for reading attributes) or output clusters (for writing attributes). If two devices are to be bound, they must have matching clusters meaning that both devices have the same cluster ID, with one device having an input cluster, and the other an output cluster. The commonly used library of clusters and cross-cluster commands are standardized as the Zigbee Cluster Library (ZCL). Built on top of the APS layer, the ZCL layer defines the ZCL header in Zigbee packets, which incorporates cluster-level information (e.g., cluster ID and command ID).

In Zigbee, in order to provide network layer security, the coordinator is typically designated as the trust center which carries out centralized security control for all the devices connected to the network. As the trust center, the coordinator grants permission to other Zigbee devices to join the network, and manages the network key that is shared by the connected devices for network-layer data encryption. Zigbee relies on the 128-bit AES-based symmetric encryption algorithm to encrypt the network payload. To describe enabled security features (e.g., data encryption and authentication), the Zigbee security layer defines an Auxiliary Security Header.

Figure 3:
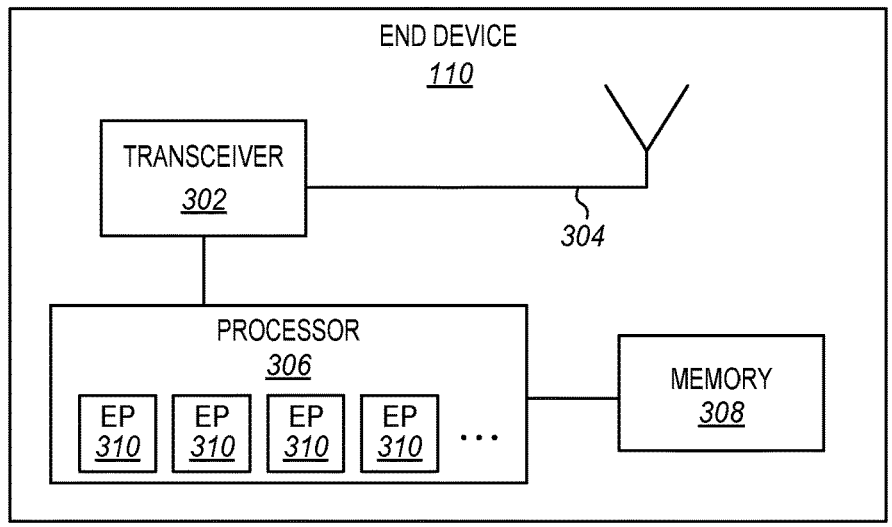
FIG. 3 is a block diagram of an end device in an illustrative embodiment.

FIG. 3 is a block diagram of an end device 110 in an illustrative embodiment. End device 110 includes a transceiver 302, an antenna 304, a processor 306, and a memory 308 in this embodiment. Transceiver 302 comprises circuitry, hardware, or means configured to communicate with a switch 102 via wireless or Radio Frequency (RF) signals through antenna 304. Processor 306 comprises circuitry, hardware, or means that performs the functions of end device 110. For example, processor 306 may format a packet, and forward the packet to switch 102 through transceiver 302. Memory 308 is a computer readable storage medium for data, instructions, applications, etc., and is accessible by processor 306. Processor 306 may enable one or more endpoints (EP) 310 within end device 110, where an endpoint defines a communication entity within end device 110 through which a specific application is carried. Each endpoint 310 may be associated with an application object. Within this description, end device 110 and endpoint 310 may be used interchangeably to refer to an entity that forwards a packet.

Figure 4:
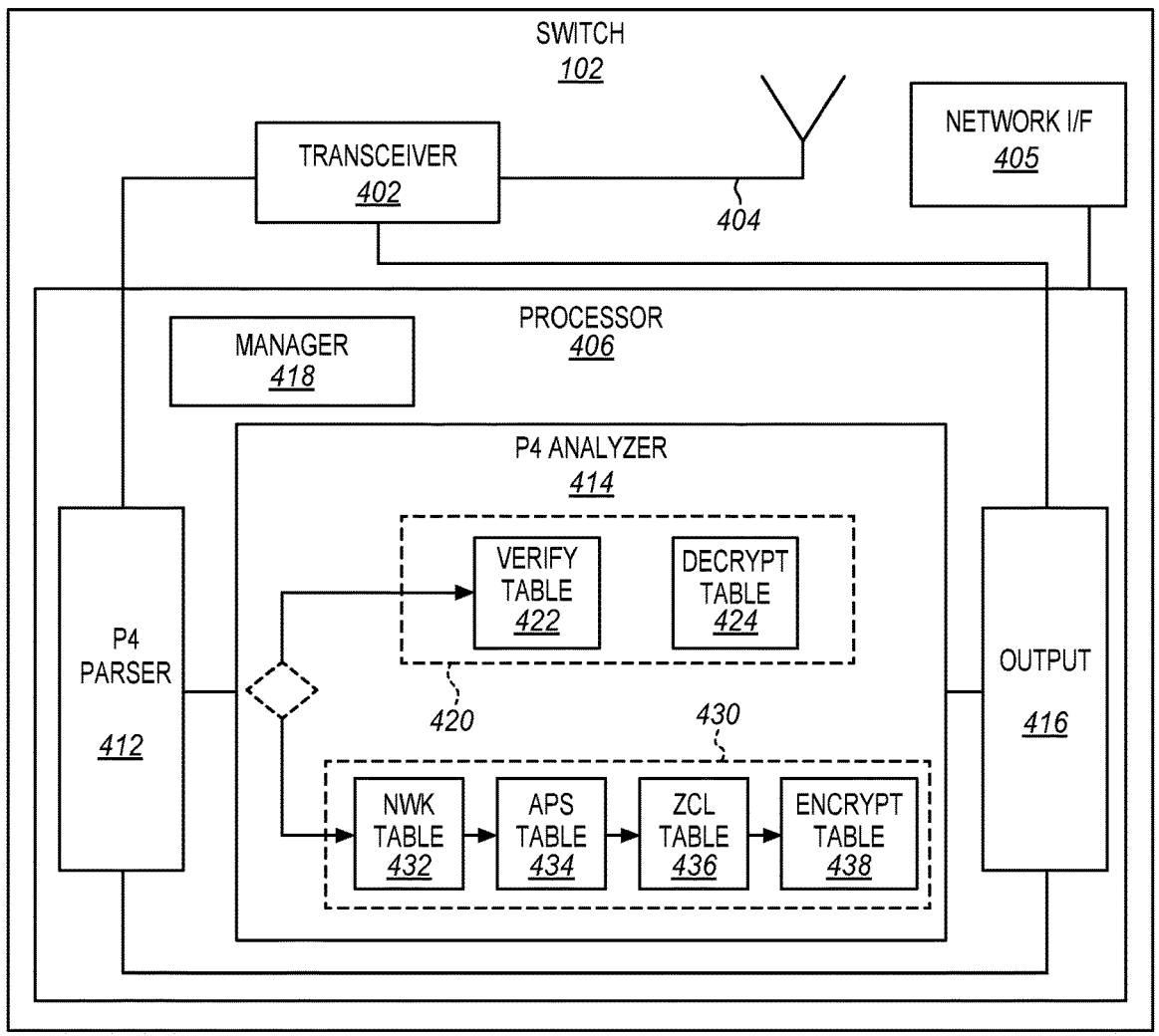
FIG. 4 is a block diagram of a switch in an illustrative embodiment.

FIG. 4 is a block diagram of a switch 102 in an illustrative embodiment. Switch 102 includes a transceiver 402, an antenna 404, a network interface 405, and a processor 406 in this embodiment. Transceiver 402 comprises circuitry, hardware, or means configured to communicate with one or more end devices 110 via wireless or RF signals through antenna 404. Network interface 405 comprises circuitry, hardware, or means configured to communicate with peer switches over IP network 104 (i.e., IP tunneling), and/or communicate with central controller 120. Processor 406 comprises circuitry, hardware, or means configured to perform the functions of switch 102. Switch 102 uses P4 for programmable packet forwarding capability. P4 is an open-source programming language for forwarding packets by devices, such as switch 102. P4 uses the concept of match-action tables. P4 tables contain the state used to forward packets. Tables are composed of lookup keys and a corresponding set of actions and their parameters. Tables and their associated actions are commonly chained together in sequence to realize the full packet forwarding logic. Actions in P4 describe packet field and metadata manipulations. In P4 context, metadata is information about a packet that is not directly derived from the parser, such as the input interface that the frame arrived on. The control flow or pipeline in P4 determines the relative sequence of tables, and allows for conditional execution of tables based on if/then/else constructions.

In this embodiment, processor 406 implements a P4 parser 412, a P4 analyzer 414, an output 416, and a manager 418. P4 parser 412 comprises circuitry, logic, hardware, software, means, etc., configured to receive a packet, and parse the packet to identify frames, fields, or sub-fields in the packet. A packet is a formatted unit of data that includes control information and user data. The control information is formatted into a header of the packet, and the user data is formatted in the payload of the packet. A header definition describes the format of the packet, and provides names for the fields/sub-fields within the packet. P4 parser 412 is configured to process a stream of data (e.g., bits) for a packet, and extract fields based on the programmed parsing graph. P4 analyzer 414 comprises circuitry, logic, hardware, software, means, etc., configured to process one or more match-action tables and fields of a packet. For example, P4 analyzer 414 may process match-action tables to modify, manipulate, or change one or more of the fields/sub-fields in a packet. Output 416 comprises circuitry, logic, hardware, software, means, port, etc., configured to forward a packet. In this embodiment, when the packet is decrypted, output 416 is configured to re-circulate the packet back to P4 parser 412, such as with a P4 recirculate command. When the packet is encrypted, output 416 is configured to forward the packet to an endpoint (e.g., through transceiver 402 or through another switch 102). Manager 418 comprises circuitry, logic, hardware, software, means, port, etc., configured to manage a PAN for switch 102, and interact with central controller 120 (through network interface 405). For example, manager 418 may be configured to receive updates to the match-action tables from central controller 120, and/or to receive a network key for encrypting/decrypting packets from central controller 120. Manager 418 may be configured to identify a PAN identifier assigned to a PAN for switch 102, and insert the PAN identifier in metadata for the packet.

P4 analyzer 414 routes a packet through control flows or pipelines for processing. Although the control flows may vary and are programmable, one control flow 420 may include a verify match-action table 422 and a decrypt match-action table 424. Another control flow 430 may include a network (NWK) layer match-action table 432, an APS layer match-action table 434, a ZCL layer match-action table 436, and an encrypt match-action table 438. The match-action tables described herein may be combined into a single match-action table, and the order in control flows 420 and 430 may be changed as desired. The functions performed by P4 analyzer 414 through the match-action tables will be described in more detail below.

P4 parser 412 is designed for switch 102, making switch 102 easily programmable and extensible for the communication protocols used by end devices 110, such as Zigbee. The following description of architecture 100 will be specific to Zigbee, although the principles described may be extended to other communication protocols. One goal of switch 102 is to manage and control the services provided by end devices 110. Therefore, the service layer (i.e., network, application, and security) of Zigbee may be portable and programmable using P4, and use operating system primitives to realize the physical and MAC layers of Zigbee. Functionalities provided by architecture 100 may be divided into three different planes: (i) a management plane that on-boards devices based on the Zigbee link layer protocol, (ii) a data plane that supports packet inspection and management at the service layer using match-action rules, and (iii) a control plane that programs the execution logic of the data plane using SDN principles.

The primary role of the management plane is to on-board end devices 110 by interconnecting them to switch 102 at the link layer, and providing a generic port interface to the data plane for feeding the protocol packets. While device on-boarding can be done mostly via operating system primitives (e.g., link layer socket interfaces), there are specific challenges to address during this process. For one, the packet switching model assumes that the packets generated by end devices 110 carry globally unique source and destination addresses across the wide area it covers. In case of Zigbee, which is a multi-hop protocol, while their packets carry source/destination network addresses, these addresses are not globally unique across different PANs. To enable global addressing for end devices 110 deployed across a wide area, the management plane maintains the unique addresses (e.g., PAN ID for Zigbee) within each port, and makes these addresses available as per-packet metadata for the data plane. These addresses are natively discovered (e.g., PAN ID in Zigbee). The data plane uses these addresses as well as native protocol fields in the packets to make forwarding decisions. To this end, central controller 120 may provide a PAN ID to manager 418 of switch 102, and manager 418 may insert the PAN ID in metadata for the packet.

Another challenge during device on-boarding is to transparently enforce policy-driven device authorization at the link layer. For this, the management plane brings central controller 120 in the loop during the protocol-specific link layer connection request/response transactions, thereby enabling centralized device authorization policies.

To handle the protocol-specific device on-boarding process, the management plane is built with protocol-dependent management modules. In one embodiment, switch 102 plays the role of the Zigbee coordinator, and therefore, can connect to a group of end devices 110. After successful network association, the coordinator is supposed to send out a transport-key packet which carries a 128-bit network key used to encrypt and decrypt the payload of packets. This key is shared among end devices 110 in the same network. In the Zigbee management module, the network keys are not generated locally but are obtained from central controller 120 and stored as part of the port descriptor. After successful on-boarding and network association by an end device 110, central controller 120 may send out the network key to the end device 110 so that cross-network device communication can be handled. Central controller 120 may also send the network key to manager 418 of switch 102.

In another embodiment, while data plane operations in the SDN are applied at the native IoT protocol layer, it is conceivable that rule-based service automation needs to be enabled beyond the physical or logical range (e.g., across different PANs in Zigbee) of end devices 110. To support such scenarios where end devices 110 are possibly connected to different switches 102 natively, switches 102 are interconnected to achieve end-to-end connections among the participating end devices 110. To this end, the IP management module of switch 102 manages backhaul IP connections to interconnect switches 102 at the IP layer. When two switches 102 need to be interconnected per connection policies, the IP management module in either switch 102 establishes an IP tunnel between the local and remote switches 102, as instructed by central controller 120, and creates a corresponding IP-type port.

For the control plane, central controller 120 is the (logically) central entity in architecture 100 from where device-specific and service-specific policies are managed. Since switches 102 communicate with central controller 120 for different events (as described in the management plane and data plane), keeping the overhead of such exchange to a minimum is a goal for scaling architecture 100. Communications between switch 102 and central controller 120 may be limited to the initial phase of device on-boarding and flow setups. Central controller 120 may be out-of-the-loop for normal service automation. To keep architecture 100 portable and extensible, standard Open vSwitch Database Management Protocol (OVSDB) and OpenFlow protocols may be used for communication of management and data planes, respectively.

In order to control the behavior of the data plane, central controller 120 leverages the extended OpenFlow Application Programming Interfaces (APIs). The southbound APIs allow pushing rules for Zigbee protocols with protocol-specific packet fields, table headers and custom actions in switch 102 using standard Openflow protocol. For northbound APIs, central controller 120 provides an interpreter interface for expressing P4-defined protocol specific (i.e., Zigbee) fields and actions in the applications.

There are multiple management/control plane applications supported by the central controller 120: (i) device authorization, (ii) device and service discovery, (iii) service automation, and (iv) route management. The service automation application and device and service discovery application may be characterized as part of the service layer. The route management application may be characterized as part of the network layer. The device authorization application may be characterized as part of the link layer. The device authorization application implements device authorization policies to determine whether to allow a given end device 110 to be connected to switch 102 at the link layer. As such, it requires coordination with the management plane. Before establishing a link layer connection with an end device 110, the management plane forwards protocol-specific connection request messages from end device 110 to the device authorization application, which contain information about end device 110 (e.g., device MAC address, manufacturer, name, protocol version, device capability). This message corresponds to an Association Request frame in Zigbee. Upon approval by the application, the management plane sets up a link layer connection with end device 110 and creates or assigns a corresponding port. Thus, central controller 120 is configured to receive information for an end device, such as from switch 102. Central controller 120 is configured to determine whether the end device is authorized to be connected to switch 102, and to transmit a response to the switch confirming authorization.

The device and service discovery application discovers device profiles and services offered by each on-boarded device. To this end, it generates and pushes protocol-specific information requests to each end device 110 via packet-out messages, and collects responses from end devices 110 via packet-in messages. In case of Zigbee, cluster profiles (or cluster IDs) are used to express the services supported by a particular endpoint of an end device 110. The device and service discovery application discovers a list of available endpoints and their corresponding input/output cluster profiles of an end device 110 by exchanging multiple rounds of Action Endpoint and Simple Descriptor request-response packets.

The service automation application configures and manages available services discovered in an end device 110. For Zigbee, this application performs service configuration in two steps: service binding and service configuration. During service binding, the application exchanges Bind request-response packets with end device 110 to allow end device 110 to bind a particular cluster profile with switch 102. After binding, the application exchanges Configure request-response packets with end device 110 to configure the cluster profile.

The route management application is responsible for discovering and configuring routing in the Zigbee network layer. During network discovery procedure, the route management application generates periodic route request commands (i.e., Link Status, Route Request) on behalf of switch 102, which are then broadcast by switch 102 to the network. In response to these packets, the connected devices in the network unicast routing path records and neighbor link status back to switch 102, which then forwards them to the route management application. Based on these route command replies, the application builds the network routing table and neighbor table.

Besides hosting the aforementioned applications, central controller 120 also provides a policy language by which the network administrator defines application/device-specific policies, and a corresponding policy engine that translates high-level policy intents into low-level OpenFlow rules for the data plane. The policy translation is out of the scope of this description.

Architecture 100 introduces very limited management/control plane traffic compared to the data plane traffic. Central controller 120 needs to interact with the data plane only during certain management/control plane events (e.g., a new device joining, route changes, policy changes, etc.). Without such events, when the desired rules are provisioned in the data plane, packets are processed locally by switch 102. This is in contrast to the cloud-centric approach, where all device-to-device interactions need to be mediated by the cloud-hosted middleware. With a sufficient number of switches 102 deployed, the proposed solution can provide a scalable SDN-based Zigbee management platform for a large number of end devices 110.

The data plane (sometimes referred to as the user plane, forwarding plane, carrier plane, or bearer plane) is the part of a network that carries user traffic. Input to the data plane is the service layer parts of the packets (and associated metadata) entering switch 102 from any of its ports. The role of the data plane is to process each packet according to the matching rules, and drop the packet, modify the packet, forward the packet through the appropriate egress ports, re-circulate the packet, etc. Packet processing is described further in FIG. 5.

Figure 5:
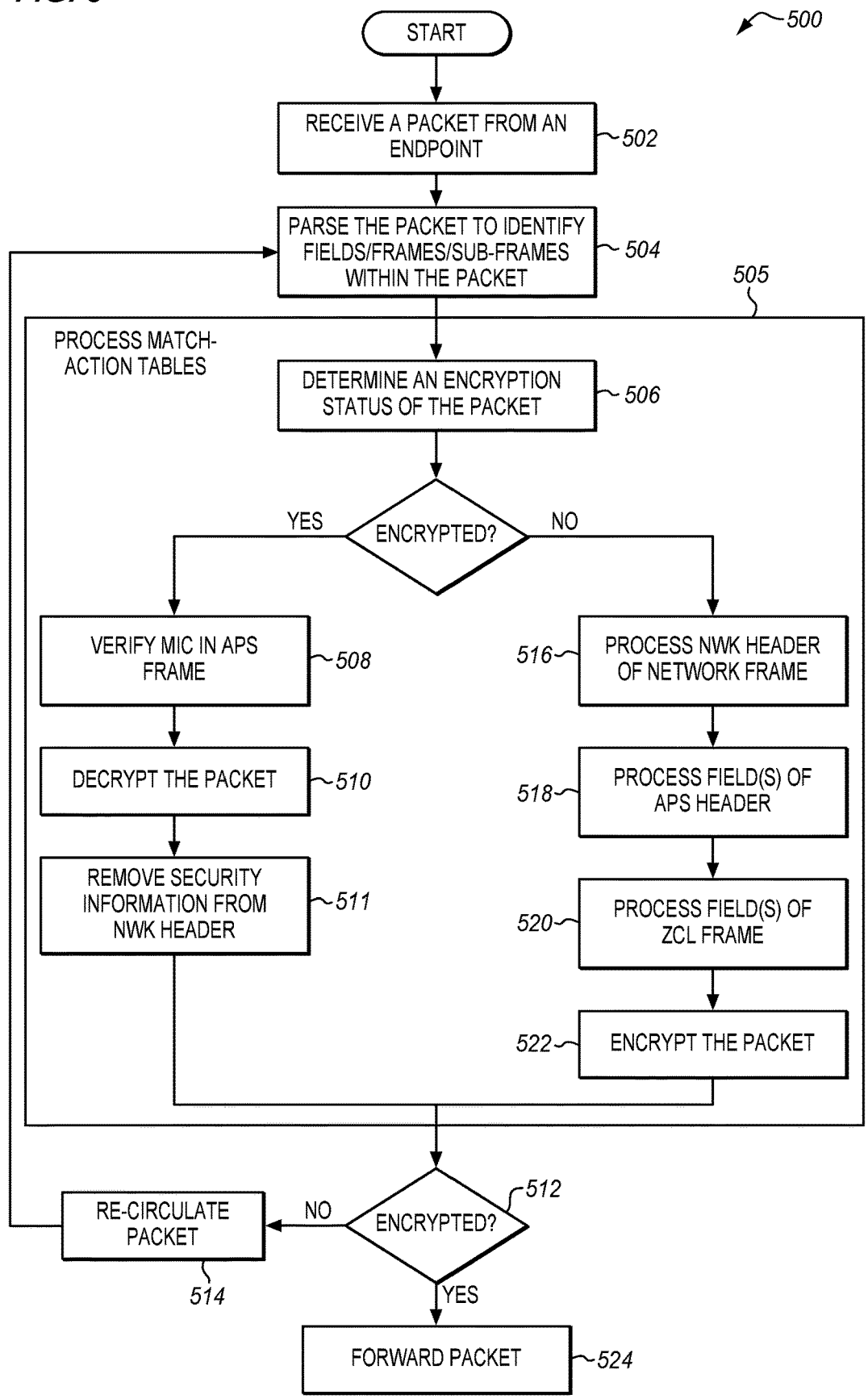
FIG. 5 is a flow chart illustrating a method of processing packets in an illustrative embodiment.

It is assumed in this embodiment that an endpoint 310 in an end device 110 formats a packet for a service, and transmits the packet to switch 102 through transceiver 302 (see FIG. 3). FIG. 5 is a flow chart illustrating a method 500 of processing packets in an illustrative embodiment. The steps of method 500 will be described with reference to switch 102 in FIG. 4, but those skilled in the art will appreciate that method 500 may be performed in other devices. Also, the steps of the flow charts described herein are not all inclusive and may include other steps not shown, and the steps may be performed in an alternative order.

Transceiver 402 of switch 102 receives the packet forwarded by endpoint 310 in the end device 110 (step 502) and destined for a second endpoint in another end device 110 (either connected to switch 102 or connected to another switch). One assumption for this embodiment may be that the transmitting endpoint 310 is incompatible with the receiving endpoint. In other words, the endpoints 310 do not have interoperable cluster profiles to provide a service using native Zigbee protocol.

Figure 6:
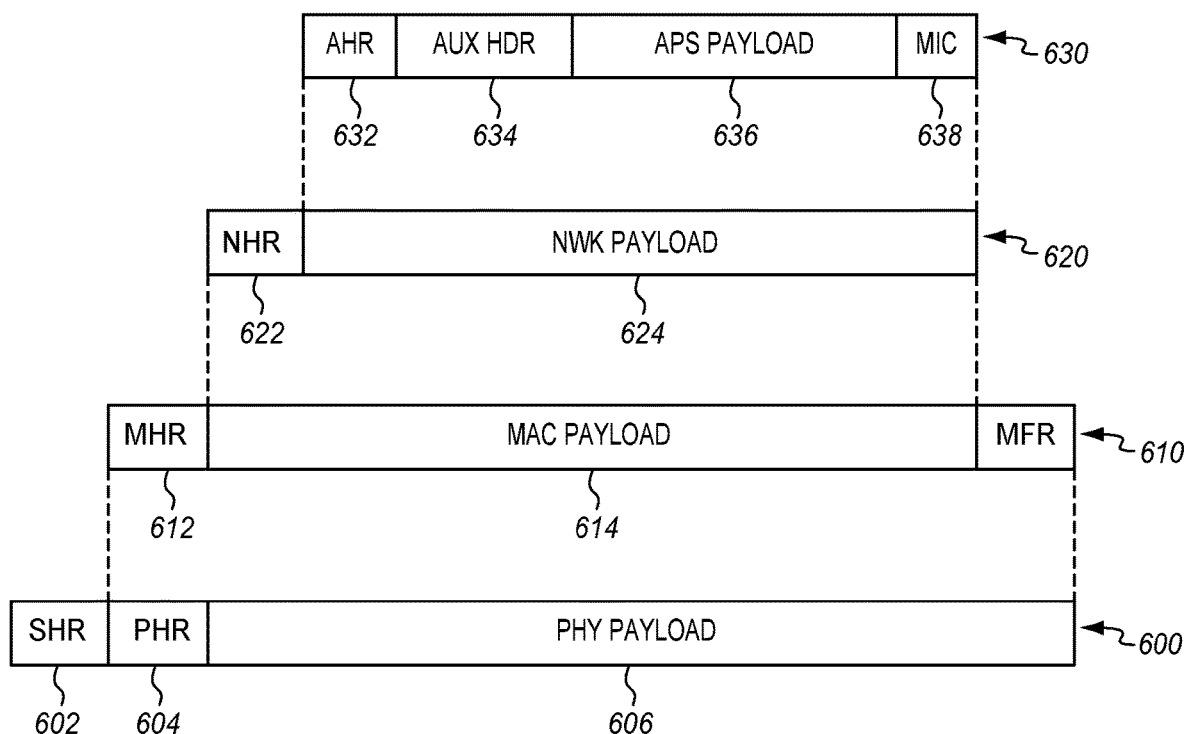
FIG. 6 illustrates a general packet structure of a Zigbee packet.

P4 parser 412 parses the packet to identify frames, fields, or sub-fields within the packet (step 504). In one embodiment, the packet is a Zigbee packet, and a general packet structure of a Zigbee packet is illustrated in FIG. 6. A Zigbee packet 600 includes a synchronization header (SHR) 602, a physical header (PHR) 604, and a physical (PHY) payload 606. A MAC frame 610 is carried in the physical payload 606, and includes a MAC header (MHR) 612 and a MAC payload 614. A network (NWK) frame 620 is carried in the MAC payload 614, and includes a network header (NHR) 622 and a network payload 624. An APS frame 630 is carried in network payload 624. APS frame 630 includes an APS header (AHR) 632, an auxiliary header (AUX HDR) 634, an APS payload 636, and a Message Integrity Code (MIC) 638. APS header 632 describes frame control, addressing information, etc., which is further described in FIG. 7. Auxiliary header 634 and MIC 638 are used for security. APS payload 636 is of variable length and carries information specific to the frame type.

Figure 7:
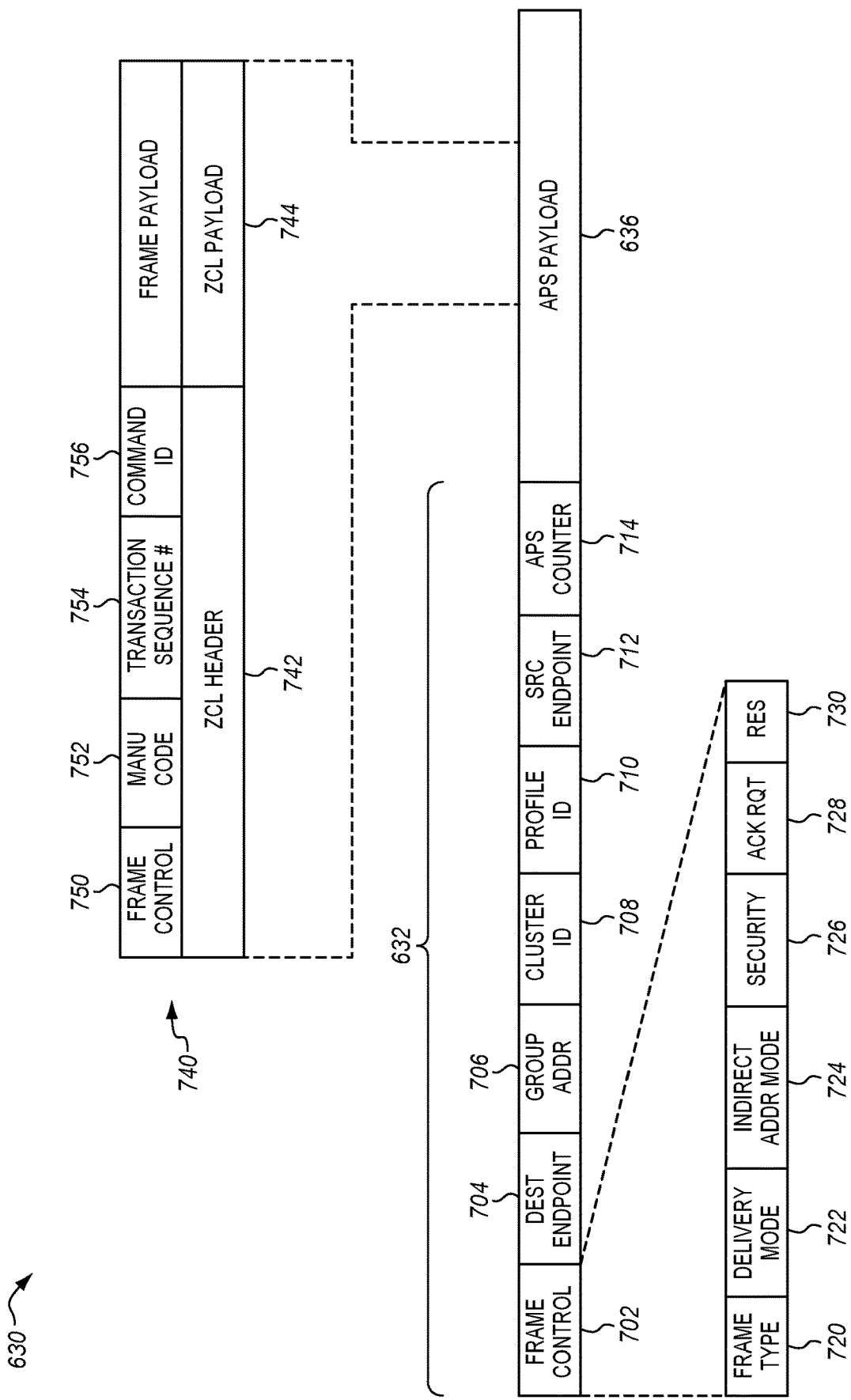
FIG. 7 illustrates a general format of an APS frame.

FIG. 7 illustrates a general format of APS frame 630. APS header 632 includes a frame control field 702, a destination endpoint field 704, a group address field 706, a cluster identifier field 708, a profile identifier field 710, a source endpoint field 712, and an APS counter field 714. Frame control field 702 is 8-bits in length and contains information defining the frame type, addressing fields, and other control flags. Destination endpoint field 704 is 8-bits in length and specifies the endpoint of the final recipient of the frame. Group address field 706 is 16-bits in length, and may be used in place of the information in destination endpoint field 704 to deliver the frame to a group of endpoints. Cluster identifier field 708 is 16-bits in length and specifies the cluster ID to which the frame relates. Profile identifier field 710 is two octets in length and specifies the ZigBee profile identifier for which the frame is intended. Source endpoint field 712 is 8-bits in length and specifies the endpoint of the initial originator of the frame. APS counter field 714 is 8-bits in length and is used to prevent the reception of duplicate frames. For instance, APS counter field 714 is incremented by one for each new transmission.

Frame control field 702 includes a frame type sub-field 720, a delivery mode sub-field 722, an indirect address mode sub-field 724, a security sub-field 726, an acknowledgement (ACK) request sub-field 728, and a reserved sub-field 730. Frame type sub-field 720 is 2-bits in length and is set to one of the non-reserved values for data (00), command (01), acknowledgement (10), and reserved (11). Delivery mode sub-field 722 is 2-bits in length and is set to one of the non-reserved values for normal unicast delivery (00), reserved (01), broadcast (10), and group addressing (11). Indirect address mode sub-field 724 is 1-bit and specifies which address field (source or destination) is omitted from the frame, if any. Security sub-field 726 is set by the Security Service Provider (SSP). ACK request sub-field 728 is 1-bit and is set to one if the recipient of the frame must reply with an acknowledgement.

APS payload 636 includes a ZCL frame 740. FIG. 7 also shows a general format for ZCL frame 740, which includes a ZCL header 742 and a ZCL payload 744. ZCL header 742 includes a frame control field 750, a manufacturer code field 752, a transaction sequence number field 754, and a command identifier field 756. Frame control field 750 is 8-bits in length and contains information defining the command type and other control flags. Manufacturer code field 752 is 16-bits in length and specifies the ZigBee assigned manufacturer code for proprietary extensions. Transaction sequence number field 754 is 8-bits in length and specifies an identification number for a single transaction that includes one or more frames in both directions. Command identifier field 756 is 8-bits in length and specifies the cluster command being used. ZCL payload 744 has a variable length and contains information specific to individual command types.

In parsing the packet received by switch 102, P4 parser 412 (see FIG. 4) may parse the packet to identify the frames, fields, or sub-fields described above. Many of the native Zigbee protocol packets have variable length fields, but a Zigbee packet has a field that specifies the number fields in the packet. For example, the Simple Descriptor Response packet contains a variable number of input/output clusters. Using counter metadata of P4, P4 parser 412 may parse a variable number of fields in the packet (similar to the P4 parsing technique for IP option header fields).

After parsing, P4 analyzer 414 processes match-action tables and the packet (and its associated fields/sub-fields and/or metadata) (step 505). For example, P4 analyzer 414 may modify the packet, drop the packet, clone the packet, forward the packet, re-circulate the packet, etc., based on the match-action tables. A match-action table specifies what data to match on, and specifies a list of possible actions. Each match-action table includes one or more entries or rules. An entry indicates a specific key to match against fields or metadata of the packet, an action that is executed when a matching entry is identified, and possibly action data. Thus, P4 analyzer 414 may process fields of the packet to identify one or more matching keys, and then perform or execute an action that is mapped to that key.

In this embodiment, P4 analyzer 414 may route the packet through one or more control flows comprised of one or more match-action tables. For example, P4 analyzer 414 may process a status match-action table to determine an encryption status of the packet (step 506). Zigbee uses encryption at the NWK layer, so P4 analyzer 414 may process network header 622 to determine whether the packet is encrypted. Responsive to a determination that the packet is encrypted, the packet may be routed through control flow 420 where P4 analyzer 414 processes one or more match-action tables that are programmed to perform actions. For example, P4 analyzer 414 may verify MIC 638 in APS frame 630 (step 508) by processing verify match-action table 422. P4 analyzer 414 may also decrypt the packet (step 510), such as when MIC 638 is verified, and remove security information from the network header 622 (step 511) by processing decrypt match-action table 424.

After processing goes through control flow 420, output 416 receives the packet. Output 416 determines whether the packet is encrypted (step 512). When the packet is decrypted, output 416 re-circulates the packet back to P4 parser 412 (step 514), such as by using a P4 recirculate action. Processing then returns to step 504 where P4 parser 412 parses the packet as decrypted. P4 analyzer 414 again processes the status match-action table to determine an encryption status of the packet (step 506). Responsive to a determination that the packet is decrypted, the packet is routed through control flow 430 where P4 analyzer 414 processes one or more match-action tables. For control flow 430, P4 analyzer 414 may process a NWK layer match-action table 432 (step 516) to determine whether one or more fields of a network header 622 in the packet matches an entry in the NWK layer match-action table 432, and perform an action in response to a match of the entry in the NWK layer match-action table 432. For example, the action may be to update or modify the field(s) of the network header, or perform other actions. P4 analyzer 414 may process APS layer match-action table 434 (step 518) to determine whether one or more fields of APS header in the packet matches an entry in the APS layer match-action table 434, and perform an action in response to a match of the entry. P4 analyzer 414 may process ZCL layer match-action table 436 (step 520) to determine whether one or more fields of a ZCL frame in the packet matches an entry in the ZCL layer match-action table 436, and perform an action in response to a match of the entry. Control flow 430 uses a staged design and leverages the structure of the Zigbee packet format to define three stages of match-action tables in control flow 430: NWK, APS, and ZCL. The NWK layer match-action table 432 applies policies based on source address and packet types (i.e., data or command). The APS layer match-action table 434 applies policies based on endpoints (source or destination), profile ID, and cluster ID. The ZCL layer match-action table(s) 436 applies policies for cluster profiles having different field formats for ZCL. Through control flow 430, P4 analyzer 414 may modify one or more fields of the packet so that the cluster profiles of the transmitting endpoint 310 and the receiving endpoint 310 are interoperable.

P4 analyzer 414 supports a range of actions for rule-based packet control, which are realized using a set of built-in actions (e.g., output or goto_table), and set of primitive P4 actions (e.g., add_header, remove_header, add_to_field, subtract_from_field, deparse, or recirculate). Some of these primitive actions are used as is, while others are used to define compound actions. The following is a list of compound actions supported by P4 analyzer 414: block, rematch, remove, and comparison. The block action drops a matching request packet, creates an error response packet from the packet, and sends the response packet back to the input port of the dropped packet. This action is implemented with a series of remove_header and add_header actions to convert a matching packet into an error response packet, set_field actions to change necessary fields in the response (e.g., swapping address), and deparse and output actions to send the response packet back to the input port. The rematch action allows a given packet to be re-submitted to the ingress processing pipeline multiple times. This is useful for applying match-action rules repetitively to a packet that contains a variable length list of fields. The number of resubmissions by this action is controlled by updating persistent per-packet metadata fields. A remove action is similar to the aforementioned rematch action, except that it removes a currently pointed field from the list. A comparison action compares a field value with a constant and applies goto_table action based on the comparison result.

As part of control flow 430, P4 analyzer 414 also encrypts the packet (step 522) by processing the encrypt match-action table 438. After processing goes through control flow 430, output 416 receives the packet and determines whether the packet is encrypted (step 512). When the packet is encrypted, output 416 forwards the packet to a destination endpoint (step 524). For example, output 416 may forward the packet to another endpoint through transceiver 402 or through another switch 102 via network interface 405.

Switch 102 advantageously uses P4 to manage a packet received from one endpoint 310 before forwarding the packet to another endpoint. Switch 102 is programmed by central controller 120 with the match-action tables to manage the packet in a desired manner. For example, even if two endpoints 310 were not compatible or interoperable for communication via native Zigbee protocol, switch 102 may be configured to modify fields in the network layer, the APS layer, and/or the ZCL layer so that these endpoints 310 are able to communicate with one another to provide a service. This means that more IoT devices will be able to interact with one another to provide a service through switch 102 even though these IoT devices would not be able to based on their native communication protocol.

Example

The following illustrates a use case in an illustrative embodiment. This example demonstrates how end devices 110 may be enabled with no matching cluster profiles to interact with each other natively. In this example, a Zigbee light bulb (light) may be turned on/off based on the motion activity reported by a nearby Zigbee motion sensor (IAS sensor). While both devices are part of the Zigbee Home Automation profile, they have no matching cluster profiles. The light bulb has an OnOff cluster profile, and the motion sensor has an Intruder Alarm System (IAS) cluster profile. Therefore, they cannot be bound together and interact with each other natively.

FIG. 8 illustrates match-action tables 800 in an illustrative embodiment. Match-action tables 800 demonstrate how switch 102 may be programmed by central controller 120 to allow the motion sensor to control the on/off operation on the light bulb. An end device 110 (i.e., the motion sensor) formats a packet and transmits the packet to switch 102. Upon receiving the packet, P4 parser 412 of switch 102 parses the packet to identify frames/fields/sub-fields in the packet. If the packet is encrypted, then P4 analyzer 414 passes the packet through control flow 420 to decrypt the packet, and the packet is re-circulated back to P4 parser 412. P4 parser 412 again parses the packet as decrypted, and P4 analyzer 414 passes the packet through control flow 430 where it verifies whether the packet is of Zigbee protocol type (Rule0). If the packet is from the motion sensor with an IAS cluster profile, then P4 analyzer 414 modifies the network frame 620, the APS frame 630, and the cluster profile of the packet to make it destined to the light bulb (Rule1 and Rule2). If the packet is about the status change of the motion sensor (i.e., alarm or un-alarm), then P4 analyzer 414 converts the ZCL frame 740 of the packet from IAS to OnOff profile (by removing/adding an old/new ZCL layer header), and sets the OnOff cluster profile command for the light bulb accordingly (Rule3 and Rule4). P4 analyzer 414 then updates the sequence number of the newly formed packet from previously stored state variables, and encrypts the packet before forwarding to another end device 110 (i.e., the light bulb) (Rule5).

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof

What is claimed is:

1. A system comprising:
a switch implemented at an edge of an Internet-Protocol (IP) network as an intermediary between end devices that use Zigbee protocol so that packets forwarded by each of the end devices flow through the switch;
the switch comprising:
a transceiver configured to receive a packet forwarded by a first endpoint in a first one of the end devices and destined for a second endpoint;
a P4 parser configured to parse the packet to identify fields of the packet; and
a P4 analyzer configured to process a plurality of match-action tables and the fields of the packet to provide data plane handling of the packet;
wherein the P4 analyzer is configured to determine an encryption status of the packet after parsing by the P4 parser, and to route the packet through a first control flow of first match-action tables of the plurality to decrypt the packet responsive to a determination that the packet is encrypted;
wherein the switch further comprises an output configured to re-circulate the packet as decrypted back to the P4 parser;
wherein the P4 analyzer is configured to determine the encryption status of the packet after parsing by the P4 parser upon the packet being re-circulated, and to route the packet through a second control flow of second match-action tables of the plurality responsive to a determination that the packet is decrypted.

2. The system of claim 1 wherein:
the output is configured to re-circulate the packet as decrypted back to the P4 parser using a P4 recirculate action.

3. The system of claim 1 wherein:
the P4 analyzer is configured to verify a Message Integrity Code (MIC) in an Application Support Sublayer (APS) frame in the packet, and to remove security information from a network header of the packet based on the first match-action tables.

4. The system of claim 1 wherein:
the P4 analyzer is configured to process the second match-action tables to:
determine whether at least one field of a network header in the packet matches a first entry in the second match-action tables, and perform a first action in response to a match of the first entry;
determine whether at least one field of an Application Support Sublayer (APS) header in the packet matches a second entry in the second match-action tables, and perform a second action in response to a match of the second entry;
determine whether at least one field of a Zigbee Cluster Library (ZCL) frame in the packet matches a third entry in the second match-action tables, and perform a third action in response to a match of the third entry; and
encrypt the packet; and
the output is configured to forward the packet after encryption to the second endpoint.

5. The system of claim 1 wherein:
the first endpoint and the second endpoint have incompatible cluster profiles; and
the P4 analyzer is configured to process the second match-action tables to modify at least one of the fields in the packet so that the cluster profiles are interoperable.

6. The system of claim 1 wherein the switch further comprises:
a network interface configured to communicate with peer switches over the IP network via an IP tunnel;
wherein each of the peer switches are deployed at the edge of the IP network.

7. The system of claim 1 wherein the switch further comprises:
a manager configured to receive updates to the plurality of match-action tables from a central controller.

8. The system of claim 1 wherein the switch further comprises:
a manager configured to receive a network key for encrypting/decrypting the packet from a central controller.

9. The system of claim 1 wherein the switch further comprises:
a manager configured to identify a Personal Area Network (PAN) identifier assigned to a PAN for the switch, and to insert the PAN identifier in metadata for the packet.

10. The system of claim 1 further comprising:
a central controller configured to receive information for the first one of the end devices from the switch, to determine whether the first one of the end devices is authorized to be connected to the switch, and to transmit a response to the switch confirming authorization of the first one of the end devices responsive to a determination that the first one of the end devices is authorized.

11. A method of managing packet forwarding by end devices that use Zigbee protocol, the method comprising:
receiving, at a switch, a packet forwarded by a first endpoint in a first one of the end devices and destined for a second endpoint using Zigbee protocol, wherein the switch is implemented at an edge of an Internet-Protocol (IP) network as an intermediary between the end devices so that packets forwarded by each of the end devices flow through the switch;
parsing, via a P4 parser in the switch, the packet to identify fields of the packet; and
processing, via a P4 analyzer in the switch, a plurality of match-action tables and the fields of the packet to provide data plane handling of the packet;
wherein processing via the P4 analyzer comprises:
determining an encryption status of the packet after parsing by the P4 parser; and
routing the packet through a first control flow of first match-action tables of the plurality to decrypt the packet responsive to a determination that the packet is encrypted;
wherein the method further comprises re-circulating the packet as decrypted back to the P4 parser;
wherein processing via the P4 analyzer further comprises:
determining the encryption status of the packet after parsing by the P4 parser upon the packet being re-circulated; and routing the packet through a second control flow of second match-action tables of the plurality responsive to a determination that the packet is decrypted.

12. The method of claim 11:
wherein
re-circulating the packet as decrypted back to the P4 parser comprises re-circulating the packet as decrypted using a P4 recirculate action.

13. The method of claim 11 wherein processing via the P4 analyzer further comprises:
verifying a Message Integrity Code (MIC) in an Application Support Sublayer (APS) frame of the packet, and removing security information from a network header in the packet based on the first match-action tables.

14. The method of claim 11 wherein:
processing via the P4 analyzer further comprises:
determining whether at least one field of a network header in the packet matches a first entry in the second match-action tables, and performing a first action in response to a match of the first entry;
determining whether at least one field of an Application Support Sublayer (APS) header in the packet matches a second entry in the second match-action tables, and performing a second action in response to a match of the second entry;
determining whether at least one field of a Zigbee Cluster Library (ZCL) frame in the packet matches a third entry in the second match-action tables, and performing a third action in response to a match of the third entry; and
encrypting the packet; and
the method further comprises forwarding the packet after encryption to the second endpoint.

15. The method of claim 11 wherein:
the first endpoint and the second endpoint have incompatible cluster profiles; and
the step of processing via the P4 analyzer further includes modifying at least one of the fields in the packet so that the cluster profiles are interoperable based on the second match-action tables.

16. A non-transitory computer readable medium embodying programmed instructions executed by one or more processors, wherein the instructions direct the processors to implement a method of managing packet forwarding by end devices that use Zigbee protocol, the method comprising:
receiving, at a switch, a packet forwarded by a first endpoint in a first one of the end devices and destined for a second endpoint using Zigbee protocol, wherein the switch is implemented at an edge of an Internet-Protocol (IP) network as an intermediary between the end devices so that packets forwarded by each of the end devices flow through the switch;
parsing, via a P4 parser in the switch, the packet to identify fields of the packet; and
processing, via a P4 analyzer in the switch, a plurality of match-action tables and the fields of the packet to provide data plane handling of the packet;
wherein processing via the P4 analyzer comprises:
determining an encryption status of the packet after parsing by the P4 parser; and
routing the packet through a first control flow of first match-action tables of the plurality to decrypt the packet responsive to a determination that the packet is encrypted;
wherein the method further comprises re-circulating the packet as decrypted back to the P4 parser;
wherein processing via the P4 analyzer further comprises:
determining the encryption status of the packet after parsing by the P4 parser upon the packet being re-circulated; and
routing the packet through a second control flow of second match-action tables of the plurality responsive to a determination that the packet is decrypted.

17. The computer readable medium of claim 16:
wherein re-circulating the packet as decrypted back to the P4 parser comprises re-circulating the packet as decrypted using a P4 recirculate action.

18. The computer readable medium of claim 16 wherein processing via the P4 analyzer further comprises:
verifying a Message Integrity Code (MIC) in an Application Support Sublayer (APS) frame of the packet, and removing security information from a network header in the packet based on the first match-action tables.

19. The computer readable medium of claim 16 wherein:
processing via the P4 analyzer further comprises:
determining whether at least one field of a network header in the packet matches a first entry in the second match-action tables, and performing a first action in response to a match of the first entry;
determining whether at least one field of an Application Support Sublayer (APS) header in the packet matches a second entry in the second match-action tables, and performing a second action in response to a match of the second entry;
determining whether at least one field of a Zigbee Cluster Library (ZCL) frame in the packet matches a third entry in the second match-action tables, and performing a third action in response to a match of the third entry; and
encrypting the packet; and
the method further comprises forwarding the packet after encryption to the second endpoint.

20. The computer readable medium of claim 16 wherein:
the first endpoint and the second endpoint have incompatible cluster profiles; and
the step of processing via the P4 analyzer further includes modifying at least one of the fields in the packet so that the cluster profiles are interoperable based on the second match-action tables.

* * * * *